US008395844B2

(12) United States Patent
Mitra et al.

(10) Patent No.: US 8,395,844 B2

(45) Date of Patent: Mar. 12, 2013

(54) APPARATUS FOR HOMOGENIZING LIGHT AND LASER APPARATUS FOR PRODUCING A LINEAR INTENSITY DISTRIBUTION IN A WORK PLANE

(75) Inventors: Thomas Mitra, Düsseldorf (DE); Andreas Bayer, Dortmund (DE); Heiko Sebastian, Koblenz (DE); Torsten Steinbrück, Essingen (DE)

(73) Assignee: Limo Patentverwaltung GmbH & Co. KG, Gerstengrund (DE)

( * ) Notice: Subject to any disclaimer, the term of this patent is extended or adjusted under 35 U.S.C. 154(b) by 633 days.

(21) Appl. No.: 12/373,432

(22) PCT Filed: Jun. 26, 2007

(86) PCT No.: PCT/EP2007/005626

§ 371 (c)(1), (2), (4) Date: Dec. 28, 2009

(87) PCT Pub. No.: WO2008/006460

PCT Pub. Date: Jan. 17, 2008

(65) Prior Publication Data

US 2011/0051253 A1 Mar. 3, 2011

(30) Foreign Application Priority Data

Jul. 13, 2006 (DE) ......................... 10 2006 032 657

Jul. 14, 2006 (DE) ......................... 10 2006 033 069

(51) Int. Cl.

*G02B 27/30* (2006.01)

(52) U.S. Cl. ......................... 359/641; 359/618; 359/640

(58) Field of Classification Search .................. 359/641

See application file for complete search history.

(56) References Cited

U.S. PATENT DOCUMENTS 6,212,012 B1 4/2001 Tanaka
6,386,709 B1 5/2002 Seki
6,717,105 B1 4/2004 Okamoto et al.
2003/0016450 A1* 1/2003 Bluemel et al. ............... 359/618
2003/0089691 A1 5/2003 Tanaka
2004/0040938 A1 3/2004 Yamazaki et al.

(Continued)

FOREIGN PATENT DOCUMENTS

DE 10136611 C1 11/2002
WO 2005069782 A2 8/2005

(Continued)

OTHER PUBLICATIONS

International Search Report dated Sep. 22, 2007.

(Continued)

*Primary Examiner* — James Jones

(74) *Attorney, Agent, or Firm* — Norris McLaughlin & Marcus, P.A.

(57) ABSTRACT

An apparatus for homogenizing light, including a lens array (5, 7, 8) with a plurality of lenses (6, 9, 10) through which the light to be homogenized can pass. The apparatus has at least two different center-to-center distances of the lenses (6, 9, 10) of the lens array (5, 7, 8), wherein the center-to-center distances of the lenses (6, 9, 10) decrease or increase from the inside to the outside.

17 Claims, 3 Drawing Sheets

U.S. PATENT DOCUMENTS

2004/0130790 A1 7/2004 Sales
2004/0136416 A1 7/2004 Tanaka
2004/0156130 A1 8/2004 Powell et al.
2005/0035104 A1 2/2005 Tanaka et al.
2006/0102599 A1 5/2006 Adams et al.
2007/0008494 A1 * 1/2007 Kimura et al. .................. 353/20

FOREIGN PATENT DOCUMENTS

WO 20050085935 A1 9/2005
WO 2006066706 A2 6/2006

OTHER PUBLICATIONS

Standard Search Report issued by the European Patent Office for the German Priority application No. 102006033069.2 dated Jan. 22, 2007.

Chinese Second Office Action dated Oct. 19, 2011 with English equivalent.

Japanese Office Action dated May 2, 2012 with English equivalent.

* cited by examiner 1
1
3
4
2
3

P2
6
P1
5
6
X
Z
f6

9

7
10
8
10
X
9
Z
f10

APPARATUS FOR HOMOGENIZING LIGHT AND LASER APPARATUS FOR PRODUCING A LINEAR INTENSITY DISTRIBUTION IN A WORK PLANE

This is an application filed under 35 USC §371 of PCT/EP2007/005626, claiming priority to DE 10 2006 032 657.1 filed on Jul. 13, 2006 and DE 10 2006 033 069.2 filed on Jul. 14, 2006.

BACKGROUND OF THE INVENTION

The present invention relates to an apparatus for homogenizing light in accordance with the preamble of claim 1 and to a laser apparatus for producing a linear intensity distribution in a work plane in accordance with the preamble of claim 7.

An apparatus of the aforementioned type is known from US 2004/0130790 A1. The apparatuses for homogenizing light which are described therein have lens arrays in which a multiplicity, in particular all of the lenses are different from all the other lenses with regard to aperture, focal length and, if appropriate, further parameters. A good homogenization of the light is achieved by means of an in particular random distribution of these different lenses in the array.

A further homogenizing apparatus is known from WO 2005/085935. In the apparatus described therein, a multiplicity of biconvex cylindrical lenses are arranged alongside one another in a lens array, wherein each of the lenses is of the same size and has the same focal length. With an apparatus of this type, an intensity distribution referred to as "top hat" can be obtained in a work plane. Such an intensity distribution has a very good homogeneity and very steep edges, for example.

For specific application, however, it may be desirable for the falling edges to have a defined gradient. This can be achieved by defocusing in homogenizers in accordance with the prior art. In this case, however, the intensity profile generally deteriorates and it is difficult to control. One application of this is for example long combined lines such as are intended to be produced with the laser apparatus mentioned in the introduction.

In accordance with the prior art, long laser lines having a length greater than 100 mm, for example, are produced only by means of a correspondingly large distance between light source and line. In this case, the distance is typically at least as large as the length of the line. So much space is often not available in industrial applications, particularly with line lengths of more than one meter.

A laser apparatus of the type mentioned in the introduction is known from U.S. Pat. No. 6,717,105 B1. The laser apparatus described therein comprises a plurality of laser light sources which are each assigned an optical means. The optical means shape laser beams with a linear intensity distribution in each case from the laser light from the laser light sources, wherein these individual laser beams can be superimposed in a work plane to form a common linear intensity distribution.

BRIEF SUMMARY OF THE INVENTION

The problem on which the present invention is based is that of providing an apparatus of the type mentioned in the introduction which can be used to obtain in a work plane a "top hat profile" with edges which have a defined gradient. Furthermore, the present invention is based on the problem of providing a laser apparatus which can be used to produce in a work plane linear intensity distributions which are relatively long and for which the source nevertheless does not have to be far away from the work plane.

This is achieved according to the invention with regard to the apparatus by means of an apparatus of the type mentioned in the introduction having the characterizing features of claim 1, and with regard to the laser apparatus by means of a laser apparatus of the type mentioned in the introduction having the characterizing features of claim 7. The dependent claims relate to preferred configurations of the invention.

In accordance with claim 1 it is provided that the center-to-center distances of the lenses decrease or increase from the inside to the outside. The desired emission characteristic of the homogenizer is thus realized by a variation of the center-to-center distance (pitch), in particular with at the same time a constant focal length of the individual lenses of the lens array. A consequence of this is that fields of different sizes are superimposed at the focal point of a field lens. This principle is suitable for a single-stage and also two-stage homogenization, and for the use of a monolithic homogenizer. The heart of the invention is therefore a homogenizer which produces a defined, trapezoidal angular distribution for one or two axes.

In accordance with claim 7, the optical means of the laser apparatus comprise a homogenizing apparatus according to the invention. Possible areas of application of such laser apparatuses are material processing methods, for example, in which it would be desirable to illuminate long lines having a width of 110 cm, for example, at a small working distance of 25 cm, for example, from the laser.

BRIEF DESCRIPTION OF THE DRAWINGS

Other features and advantages of the present invention will become clear on the basis of the following description of preferred exemplary embodiments with reference to the accompanying figures, in which.

DETAILED DESCRIPTION OF THE INVENTION

A system of Cartesian coordinates is depicted in some of the figures for clarification purposes.

Figure 1:
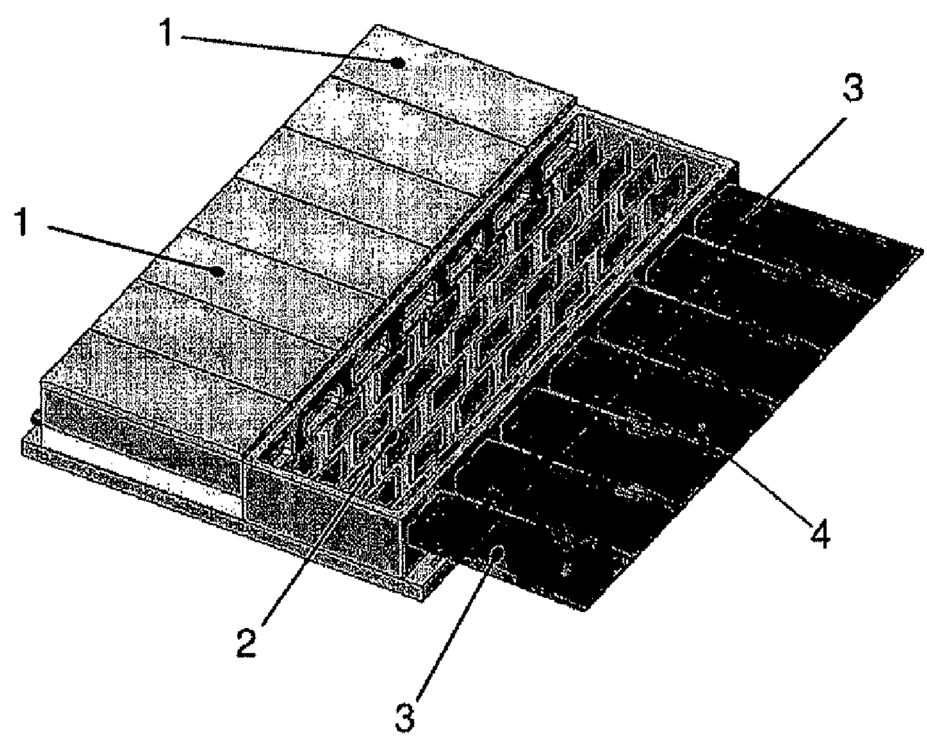
FIG. 1 shows a perspective view of a laser apparatus according to the invention.

The basic principle of a laser apparatus according to the invention is illustrated in FIG. 1. The figure reveals seven laser modules 1 having a similar, but not necessarily identical, beam profile, which illuminate an optical module. This optical module contains seven optical means 2 for beam shaping, which in each case produce laser light 3 with a linear intensity distribution at least in sections. The special feature here is that through the use of homogenizing apparatuses according to the invention (see FIG. 2*a* and FIG. 2*b*), the line length and the edge shape of each individual line of the laser light 3 are set such that a linear intensity distribution 4 arises in the work plane as a result of superimposition of the individual lines of the laser light 3. The combined seven partial lines of the laser light 3 produce a homogeneous linear intensity distribution 4.

On account of the optical module being substantially independent of the input beam, the laser modules 1 which illuminate the optical module can be exchanged without any problems.

Figure 2A:
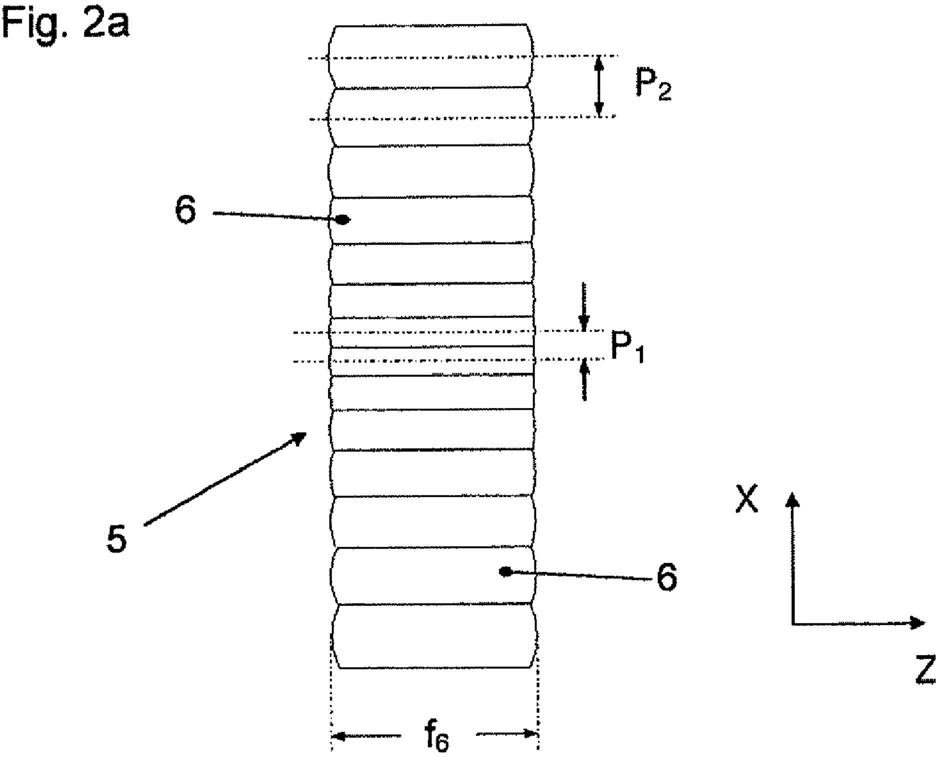
FIG. 2*a* shows a side view of a first embodiment of an apparatus for homogenizing light according to the invention.

FIG. 2*a* shows an apparatus for homogenizing light according to the invention, comprising a lens array 5 having a plurality of lenses 6. The lenses 6 are embodied as cylindrical lenses having cylinder axes in the Y-direction. It can clearly be seen that the center-to-center distance (pitch) $P_1$, $P_2$ of the lenses 6 is smaller in the center of the lens array 5 than at the edge. This is achieved by virtue of the fact that the width of the lenses 6 in the X-direction (see depicted system of coordinates), in which they are arranged alongside one another, increases from the center to the outside. As an alternative there is the possibility of the center-to-center distance decreasing from the center to the outside.

The focal length of the lenses 6 is however identical for all the lenses 6. In particular, the focal length $f_6$ of the back refractive surfaces in the Z-direction may correspond to the thickness of the lenses 6 in the Z-direction or in the propagation direction of the homogenizing light.

Figure 2B:
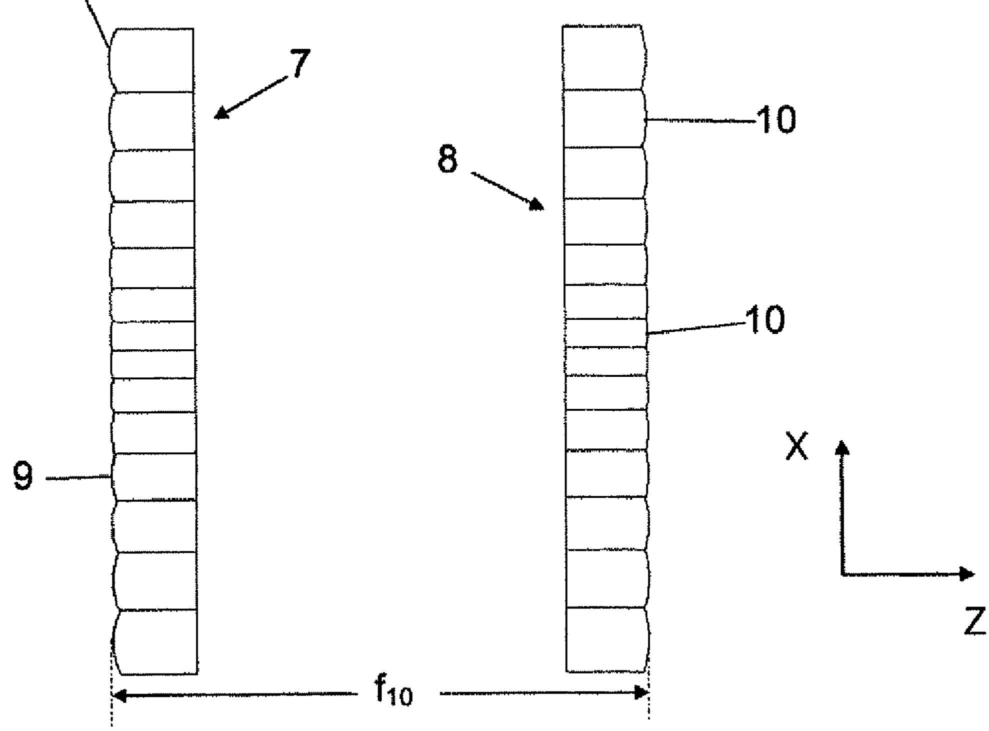
FIG. 2*b* shows a side view of a second embodiment of an apparatus for homogenizing light according to the invention.

FIG. 2*b* shows a two-stage apparatus for homogenizing light according to the invention. This apparatus comprises two lens arrays 7, 8 each having a plurality of lenses 9, 10. Here as well, the center-to-center distance $P_1$, $P_2$ of the lenses 7, 8 increases from the center to the outside. As an alternative, here as well, there is the possibility of the center-to-center distance decreasing from the center to the outside.

In this apparatus, too, the focal length of the lenses is identical for all the lenses 9 on the first lens array 7 and/or for all the lenses 10 on the second lens array 8. In particular, the focal length $f_{10}$ of the back refractive surfaces in the Z-direction may correspond to the distance from the lenses 9 to the lenses 10 in the Z-direction.

There is the possibility of embodying the apparatus according to the invention in two directions perpendicular to one another. In each case a plurality of cylindrical lenses with cylinder axes in the X-direction can then be arranged for example on the mutually facing sides of the lens arrays 7, 8 in accordance with FIG. 2*b*. These cylindrical lenses can also have a corresponding center-to-center distance that varies from the center to the outside.

Figure 3:
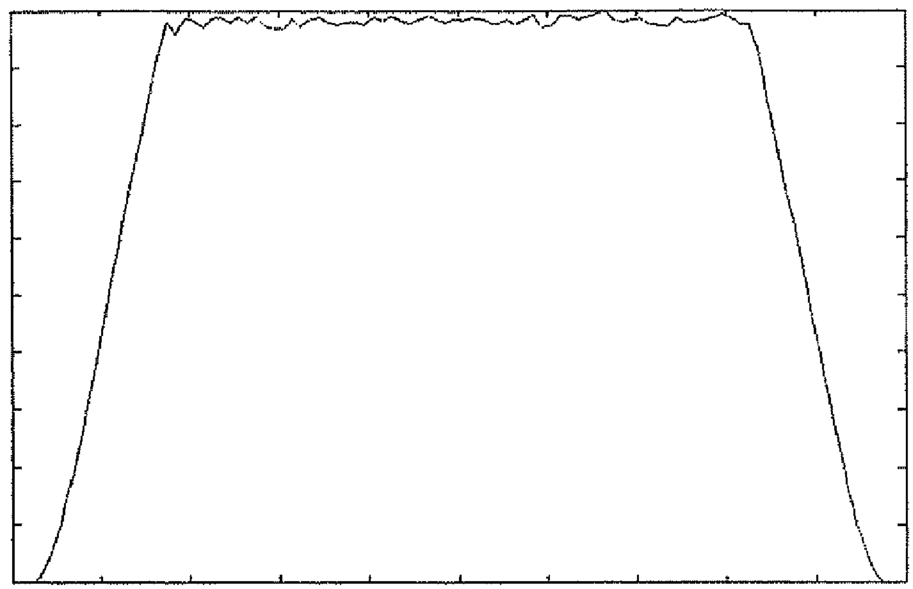
FIG. 3 shows an intensity distribution in arbitrary units which can be obtained with one of the apparatuses.

An emission characteristic of the homogenizing apparatus which can be seen by way of example from FIG. 3 is realized by the variation of the center-to-center distance (pitch) of the lenses 6, 9, 10 with at the same time a constant focal length of the individual lenses 6, 9, 10 of the lens array 5. This emission characteristic arises by virtue of the fact that fields of different sizes are superimposed at the focal point of a field lens. FIG. 3 shows that an intensity profile having a central region of constant intensity and two marginal regions with linearly falling intensity can be produced with such a homogenizing apparatus. It is therefore possible to produce a defined, trapezoidal angular distribution for one or two axes. This principle is suitable for a single-stage homogenization and also for a two-stage homogenization, and for the use of a monolithic homogenizer.

Figure 4:
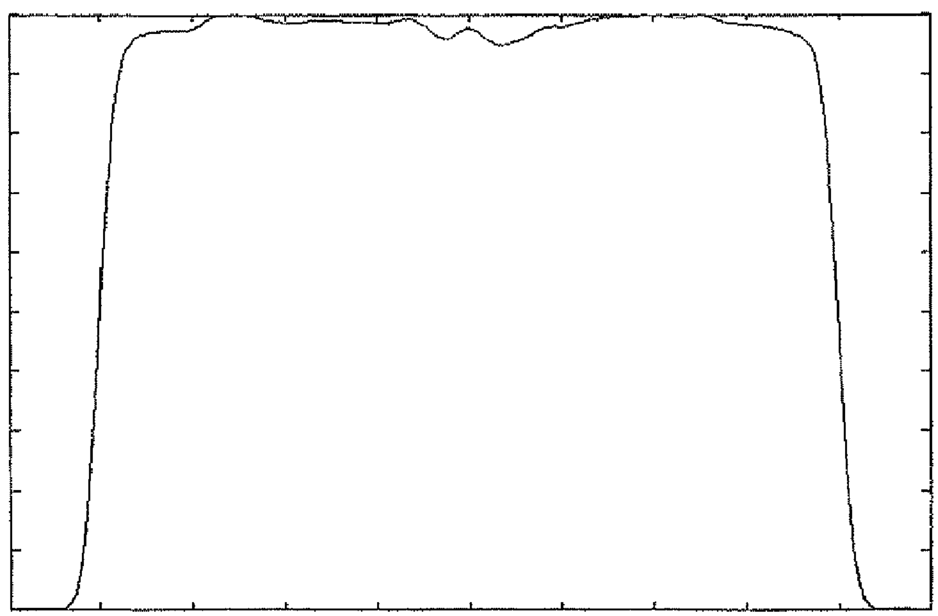
FIG. 4 shows an intensity distribution in arbitrary units which can be obtained with a laser apparatus according to the invention.

FIG. 4 illustrates a simulation result for the laser apparatus. Two lines of the laser light 3 with trapezoidal intensity distribution each having a length of 190 mm are combined to form a linear intensity distribution 4. The homogeneity attained here is approximately 96% or approximately +/−2%.

The edges having a constant gradient of the intensity distribution of the individual lines of the laser light 3 can thus be superimposed optimally in the work plane to form a linear intensity distribution 4. In this case, with a comparatively weak gradient of the edges, there is a high tolerance with respect to alignment inaccuracies in the work plane.

The invention claimed is:

1. A laser apparatus for producing a linear intensity distribution (4) in a work plane, comprising a plurality of laser modules (1) emitting laser light, and also optical means (2) which, in each case, shape the laser light emerging from one of the laser modules (1) in such a way that the laser light (3) from the individual laser modules (1) is superimposed in the work plane to form a linear intensity distribution (4), wherein the optical means (2) comprise at least two homogenizing light apparatuses, each of said apparatuses for homogenizing light including a lens array (5, 7, 8) with a plurality of lenses (6, 9, 10) through which the light to be homogenized passes, wherein at least two different center-to-center distances of the lenses (6, 9, 10) of the lens array (5, 7, 8) are provided, and wherein the center-to-center distances of the lenses (6, 9, 10) decrease or increase from the inside to the outside, in such a way that each of said apparatuses for homogenizing light produces a trapezoidal angular distribution, wherein due to the constant gradients of the edges of the trapezoidal angular distributions the laser light (3) from the individual laser modules (1) are optimally superimposed in the work plane to form a linear intensity distribution (4).

2. The apparatus as claimed in claim 1, wherein the center-to-center distances of the lenses (6, 9, 10) are the smallest in the center of the lens array (5, 7, 8) and increase continuously from the center to the edge of the lens array (5, 7, 8).

3. The apparatus as claimed in claim 1, wherein the center-to-center distances of the lenses (6, 9, 10) are largest in the center of the lens array (5, 7, 8) and decrease continuously from the center to the edge of the lens array (5, 7, 8).

4. The apparatus as claimed in claim 1, wherein a focal length ($f_6$, $f_{10}$) of at least the plurality of lenses (6, 9, 10) is identical.

5. The apparatus as claimed in claim 1, wherein the apparatus comprises two lens arrays (7, 8) with a plurality of lenses (9, 10) through which the light to be homogenized passes.

6. The apparatus as claimed in claim 1, wherein the lenses (6, 9, 10) are embodied as cylindrical lenses.

7. The laser apparatus as claimed in claim 1, wherein the optical means (2) shapes the laser light emerging from one of the laser modules (1) in such a way that laser light (3) with a linear intensity distribution at least in sections is being produced in each case, wherein the laser light (3) from the individual laser modules (1) with the linear intensity distribution at least in sections is superimposed in the work plane to form a linear intensity distribution (4).

8. The laser apparatus as claimed in claim 1, wherein each of the laser modules (1) comprises at least one laser light source.

9. The laser apparatus as claimed in claim 8, wherein the at least one laser light source is embodied as a laser diode bar or as a stack of laser diode bars.

10. The laser apparatus as claimed in claim 1, wherein each of the laser modules (1) comprises collimation means.

11. The laser apparatus as claimed in claim 1, wherein the optical means (2) comprise a field lens for beam superimposition.

12. The apparatus as claimed in claim 4, wherein the focal length ($f_6$, $f_{10}$) of all of the lenses (6, 9, 10) is identical.

13. The apparatus of claimed in claim 5, wherein both lens arrays (7, 8) are embodied in identical fashion.

14. The laser apparatus as claimed in claim 7, wherein each of the laser modules (1) comprises at least one laser light source.

15. The laser apparatus as claimed in claim 1, wherein each of the laser modules (1) comprises at least one fast-axis collimation lens.

16. The laser apparatus as claimed in claim 1, wherein each of the laser modules (1) comprises at least one fast-axis collimation lens and at least one slow-axis collimation lens.

17. The laser apparatus as claimed in claim 1, wherein the light to be homogenized passes between an incoming surface and an outgoing surface, center-to-center distances of the lenses (6, 9, 10) of the lens array (5, 7, 8) are constant on both the incoming and outgoing surfaces, and wherein the center-to-center distances of the lenses (6, 9, 10) decrease or increase from the inside to the outside along each of the incoming and outgoing surfaces.

* * * * *